United States Patent [19]

Sobotowski

[11] Patent Number: 4,876,992

[45] Date of Patent: Oct. 31, 1989

[54] CRANKSHAFT PHASING MECHANISM

[75] Inventor: Rafal A. Sobotowski, Bay Village, Ohio

[73] Assignee: Standard Oil Company, Cleveland, Ohio

[21] Appl. No.: 234,561

[22] Filed: Aug. 19, 1988

[51] Int. Cl.$^4$ .............................................. F02B 75/04
[52] U.S. Cl. ................................. 123/48 R; 123/52 A; 123/78 R
[58] Field of Search ................. 123/52 A, 53 R, 78 R, 123/48 R, 48 B, 78 F, 53 AA, 53 BA, 57 R

[56] References Cited

U.S. PATENT DOCUMENTS

| 1,457,322 | 6/1923 | Sproule . |
| 3,742,027 | 4/1956 | Mansfield . |
| 3,961,607 | 6/1976 | Brems ............................. 123/53 R |

FOREIGN PATENT DOCUMENTS

| 482777 | 1/1953 | Italy . |
| 300643 | 4/1971 | U.S.S.R. . |
| 584215 | 1/1947 | United Kingdom ............ 123/197 R |

OTHER PUBLICATIONS

Archives of Thermodynamics; vol. 5, 1/1984; Sobotow-ski et al., pp. 135–147.

Primary Examiner—David A. Okonsky
Attorney, Agent, or Firm—John C. Evans

[57] ABSTRACT

A variable compression ratio engine has a pair of crankshafts connected by a phase adjuster mechanism operative to change the phase angle between the crankshafts so as to vary the compression ratio of the engine. The phase adjuster mechanism includes two pairs of helical phasing gears. Each of those pairs consists of a gear fixedly mounted on a crankshaft and, operatively engaged therewith, a wider gear fixedly mounted on an axially movable adjuster member. The crankshafts can be arranged in-line or side-by-side in parallel. Each of the phasing gears which is fixedly connected to the axially movable adjuster member is bounded by a respective imaginary cylindrical surface whose axis coincides with and whose points are equidistant from the axis of rotation of the adjuster member, and whose diameter is equal to the outside diameter of that phasing gear, and which extends along the length of the engine block without intersecting the envelope swept by each crankshaft and connecting rod means associated with that crankshaft whereby the phasing gears of the phase adjuster mechanism are operable along the shole length of the engine block so as to minimize the length of each of the crankshafts and, ultimately, the external lengthwise dimensions of the engine.

7 Claims, 7 Drawing Sheets

CRANKSHAFT PHASING MECHANISM

This invention relates to internal combustion engines and more particularly to variable compression ratio internal combustion engines.

For the purpose of this application, the term compression ratio is defined as the maximum cylinder volume divided by minimum cylinder volume. The term VCR means variable compression ratio.

BACKGROUND OF THE INVENTION

In internal combustion engines, it is desirable to vary compression ratio during engine operation Compression ratio strongly affects in-cylinder processes and provides an exceptional degree of control over engine performance.

Conventional engines, however, have fixed compression ratios. Their performance is a compromise between conflicting requirements.

The provision of variable compression ratio in diesel engines improves exhaust emission characteristics, overall fuel efficiency, cold startability and multi-fuel capability. It provides control over peak cylinder pressures and therefore permits considerable increase of specific power output through supercharging without sacrificing engine durability.

In spark ignited engines the variability of compression ratio enables operation at the knock limit throughout the whole speed and load range. This results in part-load thermal efficiency improvement relative to conventional engines whose fixed compression ratios are restricted to relatively low values required to ensure knock free wide open throttle operation.

Numerous mechanisms for varying compression ratio in internal combustion engines have been proposed in the prior art. The majority of those mechanisms vary compression ratio by varying clearance volume. This is primarily achieved by (1) altering the volume of an auxiliary combustion chamber; (2) altering the distance between the cylinder head and the axis of rotation of the crankshaft; (3) altering the effective length of the connecting rod or; (4) altering the distance between the wrist pin axis and the top face of the piston.

So far, only two VCR mechanisms have attained series production. Both have, for decades, been used in standardized, single cylinder ASTM-CFR cetane and octane rating engines. The cetane rating engine utilizes a handwheel operated screw adjustment mechanism to vary the position of a movable endplate in a cylindrical prechamber. The octane rating engine employs a motor driven screw adjustment mechanism to vary the position of the cylinder head cylinder liner assembly relative to the axis of rotation of the crankshaft.

Prior art also includes U.S. Pat. No. 2,742,027 which discloses a two part VCR piston assembly. The inner member of this assembly is linked to the crankshaft in the conventional manner using a wrist pin and a connecting rod. The outer member which serves as the piston crown and carries the piston rings is axially movable relative to the inner member within predetermined limits. Any change in the relative position of both members alters the distance between the top face of the piston and the wrist pin axis and, therefore, affects compression ratio in the cylinder in which the whole VCR piston assembly operates. A hydraulic system utilizing engine lubricating oil supplied through the connecting rod is incorporated in the VCR piston assembly and automatically controls compression ratio as a function of engine speed and load.

Despite extensive development, the VCR piston has not been commercially successful due to engine reliability and performance problems associated with this design. Reliability problems arise because of coking of the lubricating oil throughout the piston assembly. Such coking causes malfunctioning of the compression ratio control system and leads to engine failures. The performance problem stems from the adverse effect that combustion chamber geometry changes associated with compression ratio variation have on the combustion process, especially on exhaust emissions and fuel efficiency.

However, the principal reason why the VCR piston in particular and VCR mechanisms in general have not been commercially successful is that multi-cylinder engines incorporating VCR technology are inherently mechanically complex.

The present invention belongs to a category of VCR mechanisms which vary compression ratio by altering the phase relation between two pistons operating in interconnected cylinders.

In engines utilizing VCR mechanisms of this category, compression ratio is defined as maximum combined cylinder volume divided by minimum combined cylinder volume. If, for example, the two pistons operate in the cylinder of an opposed piston engine, combined cylinder volume is defined as the total volume between those two pistons at any instant. If the two pistons operate in separate cylinders interconnected through a transfer port, combined cylinder volume is assumed to be composed of individual cylinder volumes at any instant and the transfer port volume.

Compression ratio is maximum when both pistons move in phase, reaching their respective top dead center positions simultaneously. Any phase shift from that maximum compression ratio phase relation alters compression ratio by changing both the maximum and the minimum combined cylinder volume. Said phase shift is measured in terms of crank angle relative to a phase relation which corresponds to the two pistons reaching their respective top dead center positions simultaneously. The value of the phase shift angle can be arbitrarily assigned a positive or a negative sign to indicate whether the movement of one or the other piston is advanced or delayed relative to the combined cylinder volume changes. Within the phase shift angle range of practical interest in VCR engines, the greater the absolute value of the phase shift angle, the lower the compression ratio.

The following prior art discloses mechanisms which vary compression ratio by altering the phase relation between two pistons operating in interconnected cylinders. These two pistons are generally linked to separate crankshafts and their phase relation is altered by varying the phase relation between those crankshafts. A multitude of such piston pairs may, of course, be incorporated in an engine.

U.S. Pat. No. 1,457,322 discloses a two crankshaft engine which employs a VCR mechanism comprised of helical gears, some of which are axially movable. Specifically, this mechanism includes two pairs of helical gears which couple the two crankshafts to an axially movable phase shaft. Each pair of those gears consists of a helical gear mounted on a crankshaft and, engaged therewith, a helical gear mounted on the axially movable phase shaft. The crankshafts are situated side by side and the phase shaft transversely thereto. Helix angles and directions of helixes of those gears are arranged to alter the phase relation between the two crankshafts in response to axial displacement of the phase shaft. The principal advantage of this VCR mechanism is mechanical simplicity. However, the location of the phase shaft in an extension of the crankcase results in a significant increase of engine length. In addition, the operation of helical gears on nonparallel shafts considerably reduces their load carrying capacity and/or useful life.

U.S.S.R. Pat. No. 300643 discloses a VCR mechanism which employs helical splines to vary the phase relation between two crankshafts of an opposed piston engine. The mechanism is incorporated in a transverse shaft geared to both crankshafts and consists of two separate helical spline couplings which couple two segments of the said shaft to an axially movable member located coaxially between those segments. The helix angles and directions of helices of the splines are arranged to vary the phase relation between the two segments of the transverse shaft and, consequently, between the two crankshafts, in response to axial displacement of the movable member. The principal disadvantage of this VCR mechanism is the mechanical complexity of the whole crankshaft phasing system. Due to the sliding fit requirement and the resultant presence of backlash between mating surfaces, the durability of spline couplings which are subject to heavy alternating loads is also compromised.

U.S. Pat. No. 3,961,607 discloses a two crankshaft VCR engine incorporating a planetary gear set in the crankshaft phasing system. The phase relation between crankshafts is varied by rotating the planetary gear carrier around its axis. This VCR mechanism is mechanically complex.

In 1984, an article authored by C. M. Bartolini, V. Naso and this inventor was published in a Polish journal, "Archiwum Termodynamiki", Vol. 5, No. 2. It disclosed a VCR mechanism employing two pairs of helical gears which couple the two crankshafts of the engine to an axially movable phase shaft. Each pair consists of a helical gear mounted on a crankshaft and, engaged therewith, a helical gear mounted on the movable phase shaft. The crankshafts are situated side by side and the phase shaft parallel thereto. The two crankshaft mounted gears are located at the opposite ends of the engine. Helix angles and directions of helices of the VCR mechanism gears are arranged to alter the phase relation between the two crankshafts in response to axial displacement of the phase shaft. In order to accommodate changes in the relative axial position of those gears associated with compression ratio variation, the face width of the crankshaft mounted gears is greater than the face width of the phase shaft mounted gears. This particular parallel configuration of the crankshafts and the phase shaft is favorable from the standpoint of gear durability and load carrying capacity but results in a considerable increase of engine length.

SUMMARY OF THE INVENTION

The present invention relates to an improved mechanism which varies the phase relation between a pair of crankshafts of an engine. The engine has one or more pairs of pistons, one piston in each pair linked to one crankshaft, the other piston to the other crankshaft. The pistons in each pair operate in interconnected cylinders. A change of the phase relation between the two crankshafts of the engine alters the phase relation between pistons in each pair and results in a change of compression ratio.

The two crankshafts of the engine rotate about parallel axes. They are coupled by means of a mechanism which includes two pairs of helical gears, hereafter called the phasing gears, and an axially movable adjuster member which rotates about an axis parallel to the axes of rotation of the crankshafts. Specifically, each crankshaft is coupled with the axially movable adjuster member by means of a separate pair of said phasing gears, each pair consisting of a gear fixedly mounted on a crankshaft and, operatively engaged therewith, a wider gear fixedly mounted on the adjuster member. Helix angles and directions of helices of the phasing gears are arranged to provide for the required change of the phase relation between the two crankshafts in response to axial displacement of the axially movable adjuster member.

The face widths of phasing gears in each pair are configured to accommodate the stroke of the said adjuster member.

The adjuster member is supported for rotary motion by radial sliding bearings.

A feature of the present invention is that each phasing gear fixedly mounted on the axially movable adjuster member is bounded by a respective imaginary cylindrical surface whose axis coincides with and whose points are equidistant from the axis of rotation of the said adjuster member, and whose diameter is equal to the outside diameter of that phasing gear, and which extends axially along the length of the engine block and is situated wholly outside the envelope swept by each crankshaft and by the connecting rod means associated with that crankshaft so as to permit more flexibility in positioning the crankshaft mounted phasing gears along the length of the crankshafts and, ultimately, minimize the external dimensions of the engine.

Another feature of the present invention is that any bearing journal which is incorporated on and supports th axially movable adjuster member and which is adjacent to a phasing gear fixedly mounted on the said member has a diameter greater than the outside diameter of that gear.

Yet another feature of the present invention is that each bearing journal of the preceding paragraph is shorter than its mating bearing surface incorporated in the engine structure so as to reduce the length of the said adjuster member and consequently minimize the external dimensions of the engine.

Still another feature of the present invention is that the axially movable adjuster member is rotatably supported on a stationary shaft thereby providing an alternate design for reducing the length of the said adjuster member and minimizing the external dimensions of the engine.

Still another feature of the present invention is that at least one bearing journal incorporated on the axially movable adjuster member, supporting said member and located adjacent to a phasing gear fixedly mounted on said member, has a diameter greater than the outside diameter of that phasing gear and is shorter than its mating bearing surface incorporated in the engine structure while, concurrently, at least one radial sliding bearing rotatably supports the said axially movable adjuster member on a stationary shaft thereby providing still another design for reducing the length of the said adjuster member and minimizing the external dimensions of the engine.

These and other features, objects and advantages of the present invention will be more fully understood from the following description of certain preferred embodiments taken together with the accompanying drawings:

DETAILED DESCRIPTION OF THE INVENTION

Figure 1:
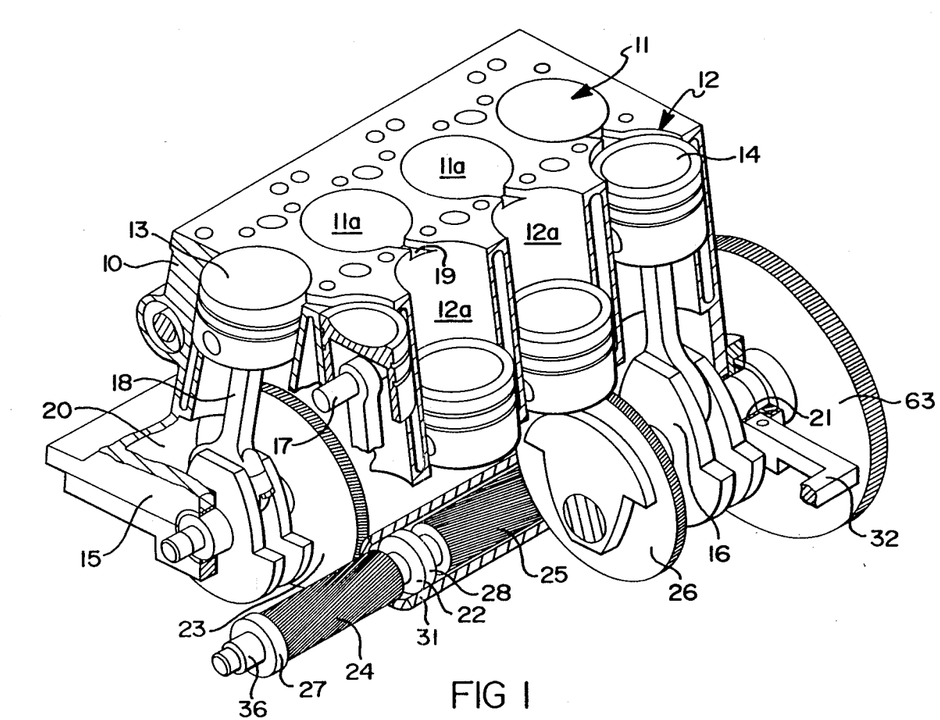
FIG. 1 is a compound axonometric section through an engine including a VCR mechanism of the present invention.

Referring now to FIG. 1, an engine is shown having an engine block 10 comprising two cylinder banks 11 and 12 of four cylinders each. For purposes of illustration, the cylinder head of the engine has not been incorporated.

Pistons 13, 14 operating in the cylinder banks 11, 12 are linked to crankshafts 15, 16, respectively. The axes of rotation of crankshafts 15, 16 are parallel. The linkage between each piston 13, 14 of the engine and its respective crankshaft includes a wrist pin 17 and a connecting rod 18.

Crankshafts 15, 16 and cylinder banks 11, 12 are situated side by side.

Each cylinder 11a in bank 11 is interconnected with an adjacent cylinder 12a in bank 12 by means of a transfer port 19 located in block 10 near the top of cylinders 11a, 12a. In the specific case of the illustrated embodiment, the axes of both cylinders 11a, 12a which comprise each pair of interconnected cylinders lie within a single plane which is perpendicular to the axes of rotation of crankshafts 15, 16.

As shown in FIG. 1, the distance between the axes of rotation of crankshafts 15, 16 is at a practical minimum. Cylinder banks 11, 12 are inclined toward each other in order to further reduce the volume and surface area of transfer ports 19. It should be emphasized, however, that cylinder arrangements and crankshaft locations associated therewith other than shown in FIG. 1 are contemplated within the scope of this invention, including the twin crankshaft opposed piston engine configuration. It will also be noted that for the purpose of the present invention the in-line configuration of the two crankshafts in a two-cylinder VCR engine will be considered a special case of the parallel crankshaft configuration.

Crankshafts 15, 16 are supported in crankcase 2 by main bearings 21.

In accordance with the present invention, an unusually simple and compact VCR mechanism is provided to couple the crankshafts 15, 16 and vary the phase relation therebetween. This mechanism includes an axially movable adjuster member 22 and helical phasing gears 23, 24, 25, and 26. Gear 23 is fixedly mounted on a crank web of crankshaft 15. Gears 24, 25 are fixedly mounted on the axially movable adjuster member 22 which rotates about an axis parallel to the axes of rotation of crankshafts 15, 16. Gear 26 is fixedly mounted on a crank web of crankshaft 16. Each of phasing gears 24, 25 is bounded by a respective imaginary cylindrical surface whose axis coincides with and whose points are equidistant from the axis of rotation of said adjuster member 22, and whose diameter is equal to the outside diameter of that gear, and which extends axially along the length of engine block 10 and is situated wholly outside the envelope swept by each crankshaft 15, 16 and by the connecting rod means associated with that crankshaft. This feature of the present invention ensures that the two phasing gears 24, 25 mounted on the axially movable adjuster member 22 may be designed to operate anywhere along the length of the engine block 10.

It should be evident, however, that in the context of the above mentioned feature of this invention, crankshaft mounted phasing gears 23, 26 are not considered to constitute a part of either crankshaft of the engine.

Figure 2:
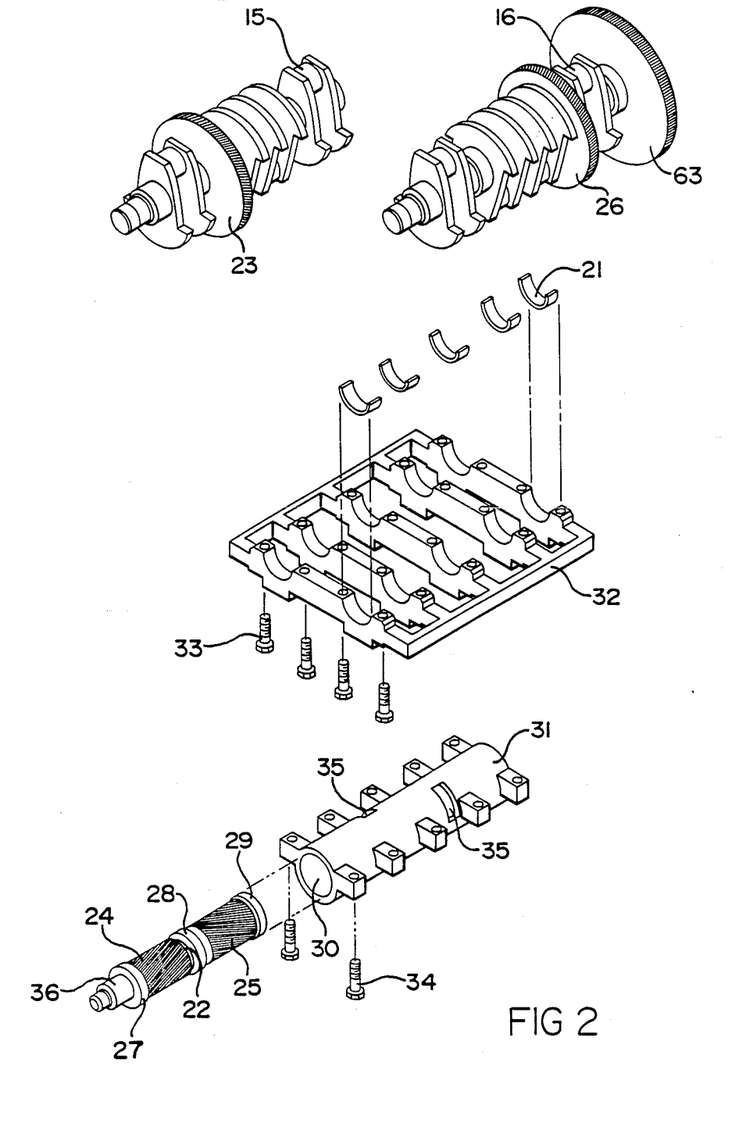
FIG. 2 is an exploded view of the VCR mechanism of FIG. 1.
Figure 3:
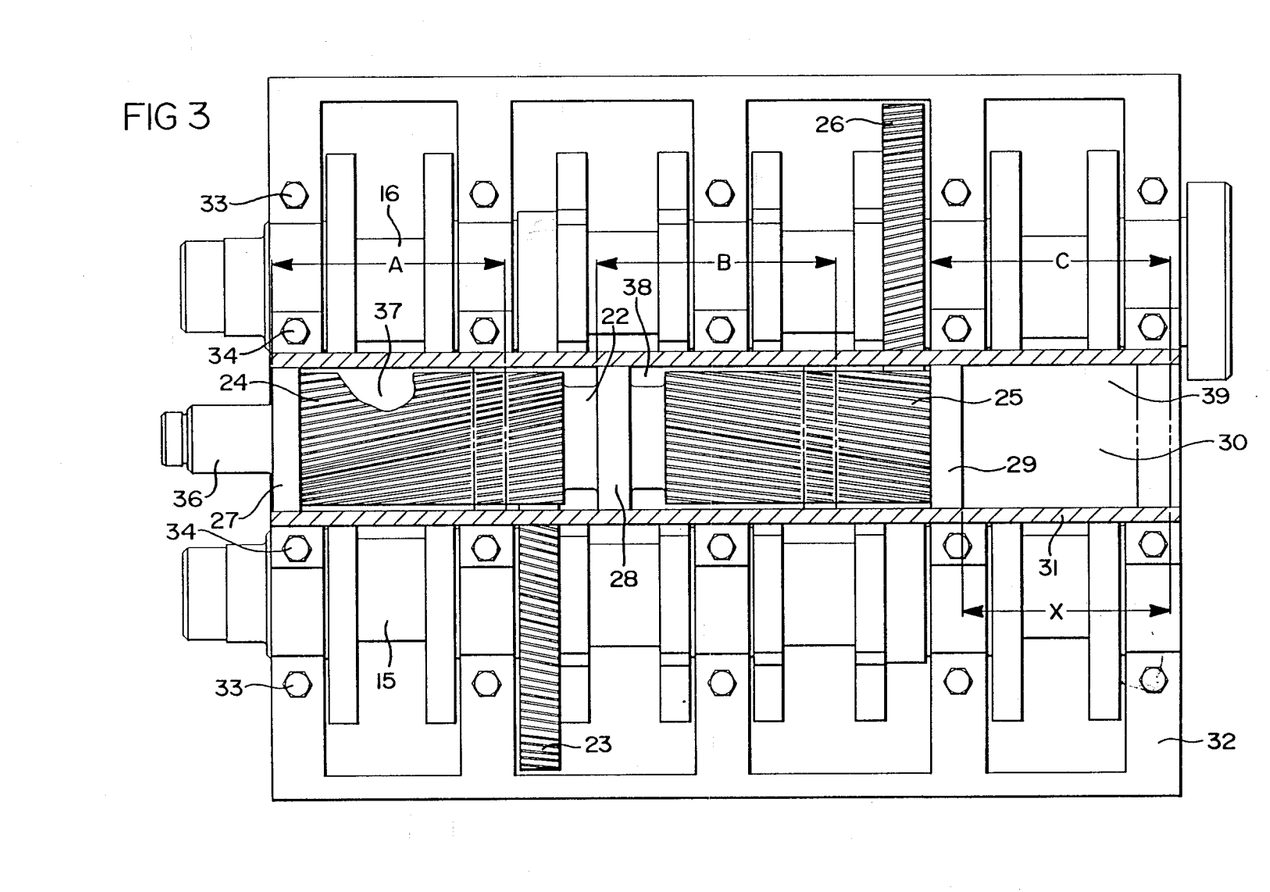
FIG. 3 is a bottom elevational view, partially sectioned, of the VCR mechanism of FIG. 1.

As illustrated in FIGS. 1–3, gears 23, 26 are offset relative to each other in the axial direction. Gear 23 is engaged with gear 24, while gear 26 is engaged with gear 25. The face widths of gears 24, 25 are greater than the face widths of gears 23, 26 so as to accommodate changes of the axial position of member 22 associated with compression ratio variation. The incorporation of narrow phasing gears 23, 26 on the crankshafts 15, 16 rather than on the axially movable adjuster member 22 minimizes the length of both crankshafts. This benefit is a direct consequence of the above mentioned feature of the present invention which alleviates the face width limitations imposed on the phasing gears by prior art designs. The additional benefit of such a configuration is that the narrow phasing gears 23, 26 can now be incorporated on any crank web of a crankshaft with little, if any, effect on cylinder spacing. This allows optimization of the relative axial location of the crankshaft mounted phasing gears from the point of view of reducing the length and maximizing the stroke of the axially movable adjuster member. However, the present invention does not require that crankshaft mounted phasing gears be located on crank webs. Other locations of those gears along the length of engine crankshafts are contemplated within the scope of this invention.

The pitch diameters of gears 23, 26 are the same. The pitch diameters of gears 24, 25 are also the same. Crankshafts 15, 16 therefore rotate at equal angular velocities. However, other gear relationships may be contemplated within the scope of this invention to achieve any suitable angular velocity ratio between the two crankshafts 15, 16 of the engine or between the crankshafts 15, 16 and the axially movable adjuster member 22.

The helix angles and directions of helices of phasing gears 23, 24, 25 and 26 are selected to provide for the required change of the phase relation between crankshaft 15, 16 in response to axial displacement of the axially movable adjuster member 22. In the illustrated embodiment, the helix angles of all phasing gears are equal and the directions of helices in gears 24, 25 mounted on member 22 are opposite.

Identical helix angles in all phasing gears 23, 24, 25, 26 and opposite directions of helices in gears 24, 25 are only shown for purposes of the illustrated embodiment. Other angle relationships are contemplated within the scope of the invention. For example, only one pair of phasing gears need consist of helical gears; the other pair may be made up of spur gears. Furthermore, it is understood that a spur gear constitutes a special case of a helical gear having a helix angle of zero.

Referring now to FIG. 2, which shows in more detail the bottom part of the engine, the axially movable adjuster member is supported for rotary motion by three radial sliding bearings. Specifically, this is accomplished by incorporating three bearing journals 27, 28, 29 on member 22. Journals 27, 28, 29, equal in diameter, are supported on a cylindrical bearing surface 30 of housing 31. Bedplate 32 which forms a single structural element incorporating all crankshaft main bearing caps also serves as a support of housing 31. Bedplate 32 is bolted to engine crankcase walls by means of bolts 33, while housing 31 is, in turn, attached to bedplate 32 by means of bolts 34. Cutouts 35 are provided in housing 31 to enable engagement of gear 23 with gear 24 and gear 25 with gear 26.

It will be noted that within the scope of this invention, any actuating and control means may be used to vary the axial position of the axially movable adjuster member 22 for the purpose of varying compression ratio. Trunnion 36 provides support for thrust bearing means, not shown, which couple member 22 with an actuating mechanism, also not shown.

In FIG. 3, the axially movable adjuster member 22 is shown at an end point of its stroke X. A partial outline of member 22 in its other end point position is also indicated. A, B and C indicate the lengths of bearing surfaces 37, 38, 39 integral with surface 30, which mate with journals 27, 28, 29 respectively, as member 22 is displaced between the end points of its stroke.

According to the present invention, the diameter of journals 27, 28, 29 is greater than the outside diameter of gears 24, 25, while the length of journals 27, 28, 29 is less than the length of their mating bearings surfaces 37, 38, 39. Relative to prior art designs, this arrangement simultaneously reduces the length of the axially movable adjuster member, minimizes the length of the engine and allows an increase of both the stroke of the said adjuster member and the face width of phasing gears mounted thereon. Helix angles of phasing gears may therefore be reduced leading to a decrease of axial forces acting on engine crankshafts and the axially movable member.

It should be understood, however, that while three radial sliding bearings of equal diameter are illustrated to rotatably support the axially movable adjuster member, the number of bearings supporting the said member may be lesser or greater than three and their diameters may be unequal providing that, according to the present invention, any bearing journal which is incorporated on and supports the axially movable adjuster member and which is located adjacent to a phasing gear fixedly mounted on the said member has a diameter greater than the outside diameter of that gear. This requirement is obviously also applicable to a bearing journal located between two phasing gears of the axially movable adjuster member.

It should be understood that, for the purpose of this invention, any bearing journal incorporated in and supporting the axially movable adjuster member and any phasing gear fixedly mounted on the said adjuster member will be considered to be located adjacent to each other irrespective of the distance separating them if no other such bearing journal and no other such phasing gear is located therebetween.

Figure 4:
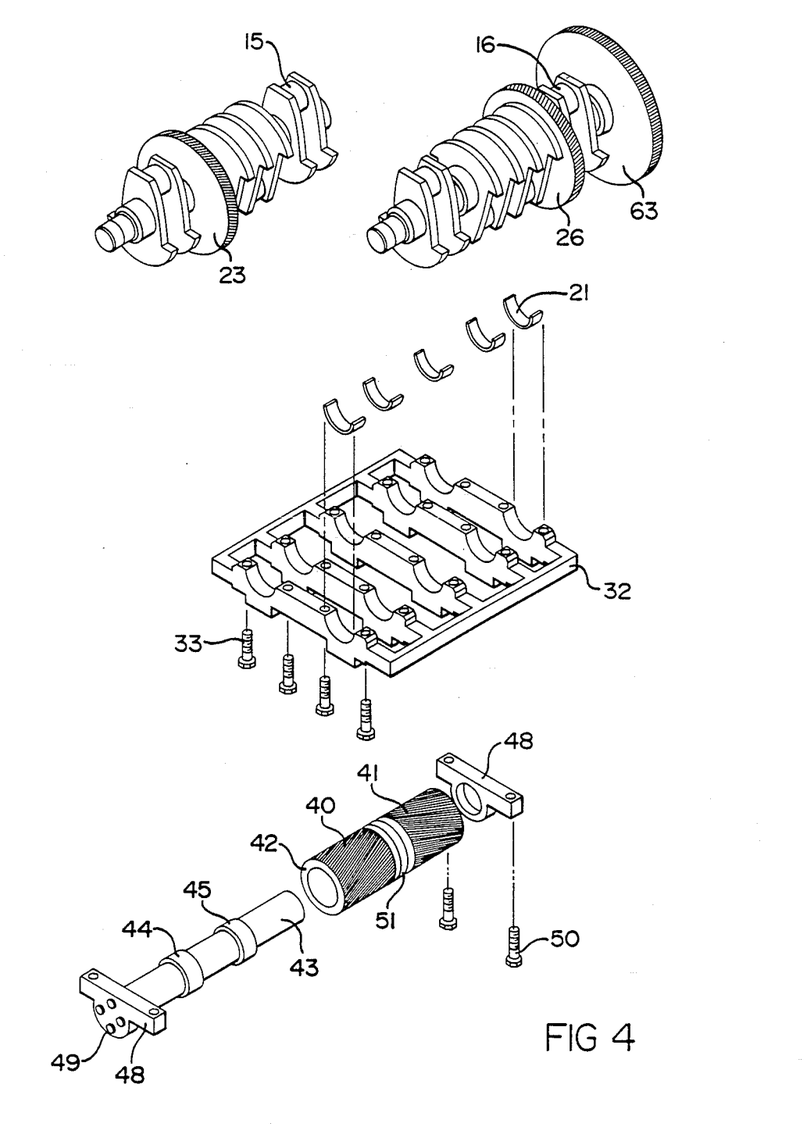
FIG. 4 is an exploded view of another embodiment of a VCR mechanism of the present invention.

FIG. 4 shows an alternate embodiment of the present invention. This embodiment, designed to be incorporated on the engine illustrated in FIG. 1, is characterized by the axially movable adjuster member being rotatably supported on a stationary shaft by radial sliding bearings. Specifically, FIG. 4 shows helical phasing gears 40, 41 fixedly mounted on axially movable adjuster member 42 which rotates about an axis parallel to the axes of rotation of crankshafts 15, 16. Each of phasing gears 40, 41 is bounded by a respective imaginary cylindrical surface whose axis coincides with and whose points are equidistant from the axis of rotation of said adjuster member 42, and whose diameter is equal to the outside diameter of that gear, and which extends axially along the length of engine block 10 and is situated wholly outside the envelope swept by each crankshaft 15, 16 and by the connecting rod means associated with that crankshaft. Gears 40, 41 are engaged with gears 23, 26 fixedly mounted on crank webs of crankshafts 15, 16 respectively. It should be noted, however, that in the context of the above mentioned feature of the present invention, the crankshaft mounted phasing gears 23, 26 are not considered to constitute a part of either crankshaft of the engine.

Gears 23, 26 are offset relative to each other in the axial direction. Face widths of gears 40, 41 are greater than face widths of gears 23, 26 in order to accommodate changes of the axial position of member 42 associated with compression ratio variation. The benefits of this face width relationship between the phasing gears are identical o those described in relation to the design of the VCR mechanism shown in FIGS. 1-3. Likewise, within the scope of the present invention illustrated in FIG. 4, the location of crankshaft mounted phasing gears along the length of the crankshafts is not restricted to crank webs.

The pitch diameters of gears 23, 26 are the same. The pitch diameters of gears 40, 41 are also the same. However, other than shown gear relationships are contemplated within the scope of this invention to enable achieving any suitable velocity ratio between the two crankshafts 15, 16 of the engine, as well as between the crankshafts 15, 16 and the axially movable adjuster member 42.

Any references to the helix angles and directions of helices of phasing gears 23, 24, 25, 26 of the VCR mechanism illustrated in FIGS. 1-3 also apply to phasing gears 23, 40, 41, 26, respectively, of the VCR mechanism shown in FIG. 4.

Figure 5:
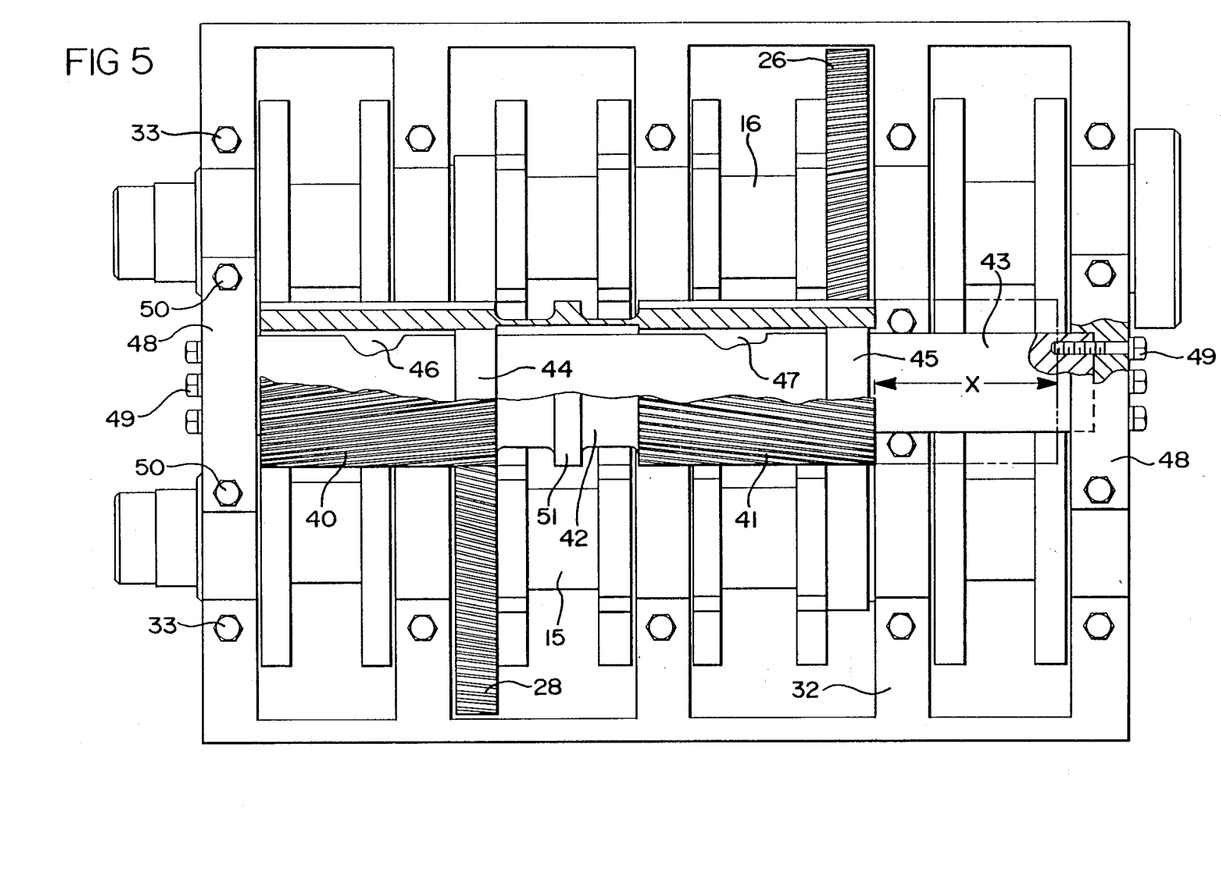
FIG. 5 is a bottom elevational view, partially sectioned, of the embodiment of the invention shown in FIG. 4.

Referring now to FIG. 5, member 42 is rotatably supported on stationary shaft 43 by two radial sliding bearings consisting of journals 44, 45 equal in diameter, incorporated on said shaft 43 and mated with cylindrical bearing surfaces 46, 47 respectively, incorporated in member 42.

As shown in FIGS. 4 and 5, shaft 43 is fixedly mounted in two supports 48 by means of bolts 49. Supports 48 are, in turn, attached to bedplate 32 using bolts 50. Bedplate 32 which forms a single structural element incorporating all crankshaft main bearing caps of the engine is bolted to crankcase walls by means of bolts 33.

Referring again to FIG. 5, the axially movable adjuster member 42 is shown at an end point of its stroke X. Also shown is a partial outline of member 42 in its other end point position.

Flange 51 provides support for thrust bearing means, not shown, which couple member 42 with an actuating mechanism, also not shown. Within the scope of this invention, any actuating and control means may be employed to vary the compression ratio by altering the axial position of the axially movable adjuster member.

It should also be emphasized that, within the scope of the present invention illustrated in FIGS. 4 and 5, more than two radial sliding bearings may be used to rotatably support the axially movable adjuster member on the stationary shaft. Furthermore, the length of bearing journals supporting said member need not be less than the length of their mating bearing surfaces and the diameters of those journals need not be equal.

Figures 6, 6A:
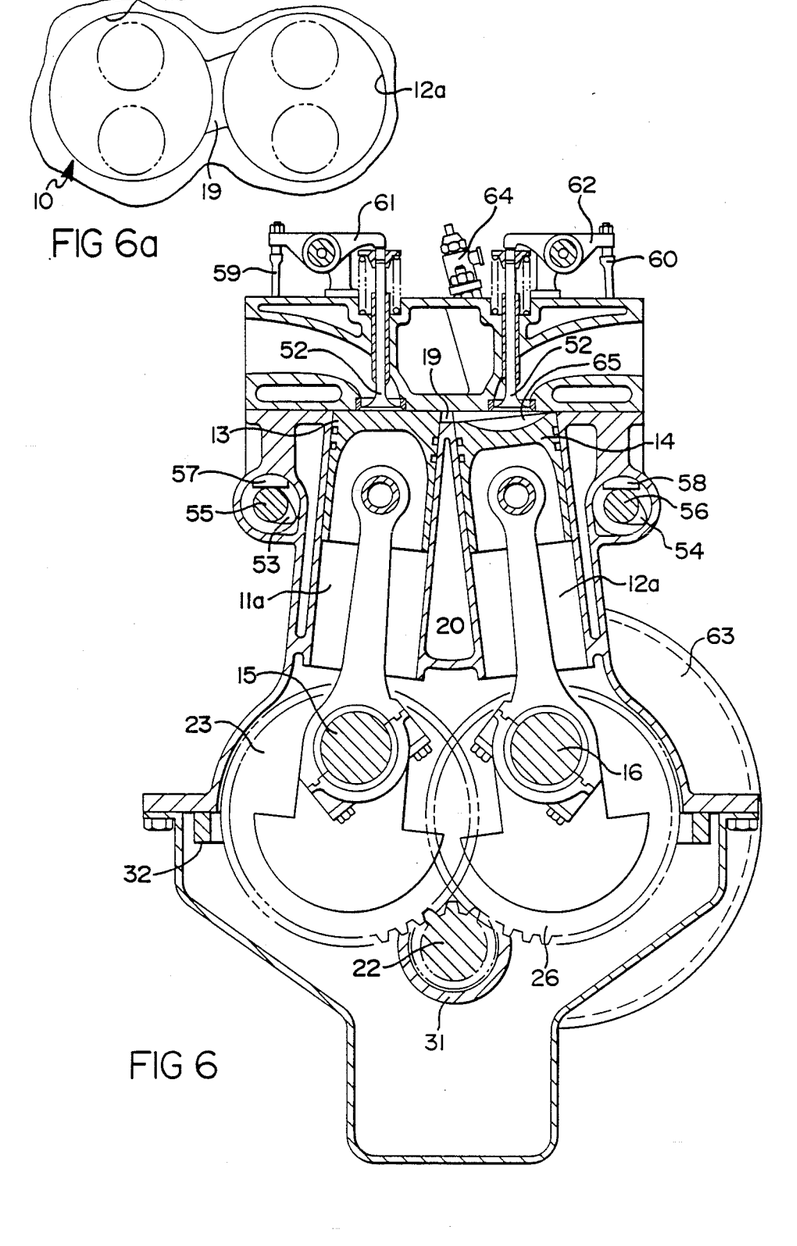
FIG. 6 is a transverse sectional view of the engine shown in FIG. 1.
FIG. 6A is a fragmentary top elevational view of the side-by-side cylinders of the engine shown in FIG. 1.

FIG. 6 shows a transverse cross section of a VCR engine incorporating a mechanism of the present invention. A compound axonometric section of the same engine has already been presented in FIG. 1. Specifically, FIG. 6 illustrates pistons 13, 14 operating in their respective cylinders 11a, 12a interconnected through transfer port 19. Said pistons 13, 14 are shown in their respective top dead center positions which corresponds to zero phase shift angle and maximum compression ratio. It should be noted, however, that in practical applications of the present invention, the phase shift angle range need not include the zero value. In other words, the highest compression ratio utilized in an engine may correspond to a phase shift angle other than zero. On the other hand, certain applications may require that the phase shift angle range include zero as well as positive and negative values.

For the purpose of the following discussion, it is assumed that the axially movable adjuster member 22 is situated at an end point of its stroke. It is also assumed that the helix angles and directions of helices of the phasing gears are arranged to result in the movement of pistons 14 being progressively advanced and the movement of pistons 13 being progressively delayed relative to combined cylinder volume changes as member 22 is displaced in the direction of the other end point of its stroke. Pistons 14 will, therefore, be referred to as leading pistons while pistons 13 will be referred as trailing pistons. Accordingly, crankshaft 16 will be referred to as leading crankshaft, while crankshaft 15 will be referred to as trailing crankshaft. Also, cylinders 12a will be referred to as leading cylinders, while cylinders 11a will be referred to as trailing cylinders.

The power plant shown in FIG. 6 is a four-stroke engine although the present invention is also applicable to two-stroke engines.

Diameters of interconnected cylinders 11a, 12a are equal. Strokes of pistons 13, 14 operating therein are also equal. However, this equality is shown solely for the purposes of the illustrated embodiment as other dimensional relationships between diameters of interconnected cylinders and strokes of pistons operating therein are contemplated within the scope of the invention.

Each cylinder of the engine shown in FIG. 6 is provided with an intake valve 52 and an exhaust valve, not shown. Cams 53 incorporated on camshaft 55 operate valves in cylinders 11a through cam followers 57, pushrods 59 and rocker arms 61. Cams 54 incorporated in camshaft 56 operate valves in cylinders 12a through cam followers 58, pushrods 60 and rocker arms 62. Camshaft 55 is driven by trailing crankshaft 15 while camshaft 56 is driven by leading crankshaft 16. Camshafts 55, 56 are coupled to their respective crankshafts by means of suitable drives, not shown, such as timing gears or chain drives. It is important to point out that changes of the phase relation between crankshafts 15, 16 associated with compression ratio variation directly affect the phase relation between camshafts 55, 56. As a result, the timing of valve events in cylinders 11a, 12a remains unchanged relative to crank angle positions of crankshafts 15, 16 respectively, but varies with phase shift angle relative to combined cylinder volume changes.

Flywheel 63 is mounted on leading crankshaft 16.

The engine illustrated in FIG. 6 is of the direct injection diesel type. A single multihole fuel injector 64 injects fuel into a bowl 65 formed in the top face of the leading piston 14. It should be understood, however, that while a diesel engine has been illustrated in FIG. 6, the present invention does not impose restrictions as to the type of combustion system that may be used in conjunction therewith.

Figure 7:
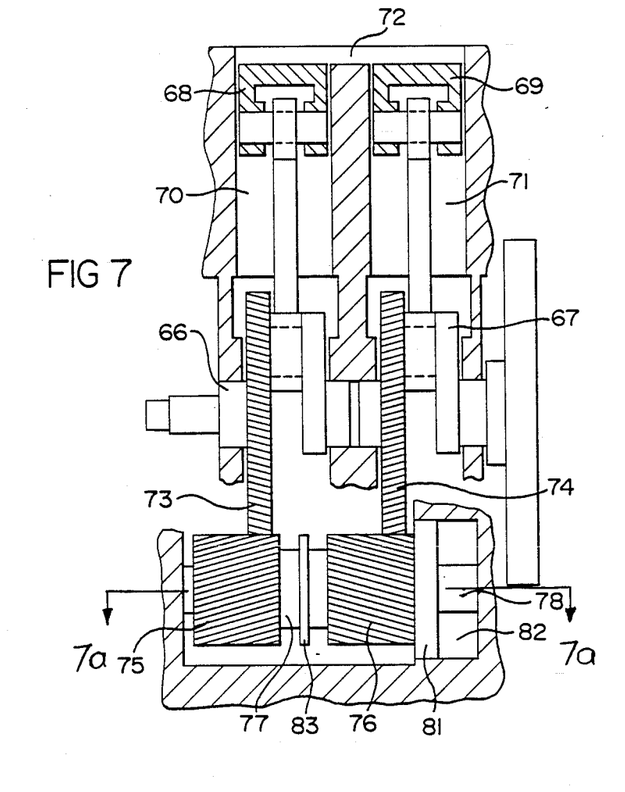
FIG. 7 is a fragmentary sectional view of an in-line engine including still another embodiment of a VCR mechanism of the present invention.
Figure 7A:
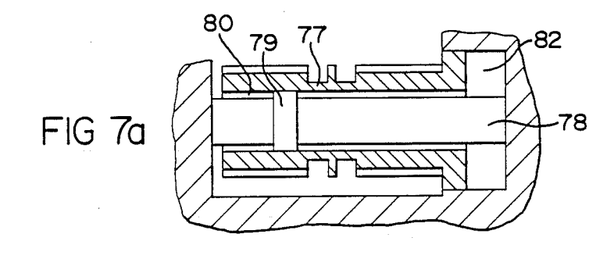
FIG. 7A is a longitudinal sectional view taken along the line 7A—7A of FIG. 7 looking in the direction of the arrows.

Illustrated in FIGS. 7 and 7A is yet another embodiment of the invention which combines features of embodiments previously described in reference to FIGS. 1–6. Specifically, FIG. 7 shows a two-cylinder engine having two crankshafts 66, 67 situated in-line. Pistons 68, 69 linked to crankshafts 66, 67 respectively, operate in separate cylinders 70, 71 situated side by side and interconnected through a transfer port 72. For purposes of illustration, the cylinder head of the engine has not been incorporated.

The phase adjuster mechanism which controls the phase relation between crankshafts 66, 67 consists of helical gears 73, 74 fixedly mounted on crank webs of said crankshafts 66, 67 respectively and helical gears 75, 76 fixedly mounted on the axially movable adjuster member 77. Gear 73 is engaged with gear 75 while gear 74 is engaged with gear 76.

Referring now to FIG. 7A, the axially movable adjuster member 77 is supported on a stationary shaft 78 by means of a radial sliding bearing composed of bearing journal 79 incorporated in shaft 78 and a mating cylindrical bearing surface 80 incorporated on member 77. Another radial sliding bearing which supports member 77 consists of a bearing journal 81 incorporated on said member 77 and a mating cylindrical bearing surface 82 incorporated in the engine structure, said journal 81 having a diameter greater than the outside diameter of adjacent gear 76 and being shorter than said surface 82.

Flange 83 provides support for thrust bearing means, not shown, which couple member 77 with an actuating mechanism, also not shown.

It should also be emphasized that, for the purpose of this invention, any bearing journal incorporated in and supporting the axially movable adjuster member and any phasing gear fixedly mounted on the said adjuster member will be considered to be located adjacent to each other irrespective of the distance separating them, if no other such bearing journal and no other such phasing gear is located therebetween.

It is important to note that while the embodiments illustrated in FIGS. 1–7 show each pair of phasing gears as consisting of two gears in direct engagement, arrangements are contemplated within the scope of this invention wherein any pair of phasing gears consists of two gears operatively engaged therebetween through other gear means, i.e., an idler gear.

What is claimed is:

1. In a VCR engine having two crankshafts which rotate about parallel axes, one or more pairs of pistons with one piston in each pair linked to one of the crankshafts and the other piston in each pair linked to the other crankshaft, the pistons in each pair operating in interconnected cylinders, a phase adjuster mechanism including an axially movable adjuster member and two pairs of helical phasing gears, said member rotatable about an axis parallel to the axes of rotation of the crankshafts and supported by radial sliding bearings, each pair of said phasing gears consisting of a phasing gear fixedly mounted on a respective one of said crankshafts and a respective wider phasing gear operatively engaged therewith and fixedly mounted on the adjuster member, the respective helix angles and directions of helices of said phasing gears being arranged to alter the phase relation between the two crankshafts in response to axial displacement of the adjuster member, the combination comprising:

an engine block;

connecting rod means operatively associated with the crankshafts;

each of said crankshafts together with the connecting rod means associated therewith sweeping a respective envelope during engine operation;

each of said two phasing gears on said adjuster member bounded by a respective imaginary cylindrical surface whose axis coincides with and whose points are equidistant from the axis of rotation of said adjuster member, and whose diameter is equal to the outside diameter of said phasing gear bounded thereby and which extends axially along the length of said engine block without intersecting said envelopes.

2. In the VCR engine of claim 1, said radial sliding bearings having bearing journals incorporated on said axially movable adjuster member;

at least one said bearing journal located adjacent to a phasing gear fixedly mounted on said adjuster member;

each said bearing journal that is located adjacent to a phasing gear fixedly mounted on said axially movable adjuster member has a diameter greater than the outside diameter of that phasing gear.

3. In the VCR engine of claim 2, means defining a mating bearing surface for each said bearing journal located adjacent to a phasing gear fixedly mounted on said axially movable adjuster member, each said bearing journal being shorter than its mating bearing surface.

4. In the VCR engine of claim 1, a stationary shaft;

and said radial sliding bearings having bearing journals incorporated on said stationary shaft.

5. In the VCR engine of claim 1 a stationary shaft, and said radial sliding bearings consisting of at least one bearing having a bearing journal incorporated on said axially movable adjuster member and at least one bearing having a bearing journal incorporated on said stationary shaft.

6. In the VCR engine of claim 5, at least one said bearing journal on said axially movable adjuster member being located adjacent to a phasing gear fixedly mounted on said adjuster member;

each said bearing journal that is incorporated on said axially movable adjuster member and located adjacent to a phasing gear fixedly mounted on said adjuster member has a diameter greater than the outside diameter of that phasing gear.

7. In the VCR engine of claim 6, means defining a mating bearing surface for each said bearing journal incorporated on said axially movable adjuster member and located adjacent to a phasing gear fixedly mounted on said adjuster member;

each said bearing journal being shorter than its mating bearing surface.

* * * * *